(12) United States Patent  
Shea

(10) Patent No.: US 8,566,522 B2
(45) Date of Patent: *Oct. 22, 2013

(54) SYSTEM AND METHOD FOR MANAGING A CACHE USING FILE SYSTEM METADATA

(71) Applicant: Open Text S.A., Luxembourg (LU)

(72) Inventor: James Conrad Shea, West Lake Hills, TX (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,539

(22) Filed: Feb. 13, 2013

(65) Prior Publication Data

US 2013/0159627 A1  Jun. 20, 2013

Related U.S. Application Data

(63) Continuation of application No. 12/956,921, filed on Nov. 30, 2010, now Pat. No. 8,407,419.

(51) Int. Cl.
*G06F 13/00* (2006.01)

(52) U.S. Cl.
USPC ........... 711/122; 711/112; 711/118; 711/203; 710/52; 707/814

(58) Field of Classification Search
USPC .............. 711/122, 118, 203; 710/52; 707/814
See application file for complete search history.

(56) References Cited

U.S. PATENT DOCUMENTS

| | | | |
|---|---|---|---|
| 4,426,682 A | 1/1984 | Riffe et al. | |
| 6,081,868 A * | 6/2000 | Brooks | 711/3 |
| 6,425,057 B1 | 7/2002 | Cherkasova et al. | |
| 7,073,087 B2 * | 7/2006 | Horie et al. | 713/600 |
| 7,818,506 B1 | 10/2010 | Shepstone et al. | |
| 7,860,820 B1 | 12/2010 | Rajkumar | |
| 8,407,419 B2 | 3/2013 | Shea | |
| 2001/0034771 A1 | 10/2001 | Hutsch et al. | |
| 2002/0010798 A1 | 1/2002 | Ben-Shaul et al. | |
| 2002/0138511 A1 | 9/2002 | Psounis et al. | |
| 2002/0156702 A1 | 10/2002 | Kane | |

(Continued)

FOREIGN PATENT DOCUMENTS

| | | |
|---|---|---|
| EP | 0412245 | 2/1991 |
| WO | WO02/35360 | 5/2002 |

OTHER PUBLICATIONS

Office Action issued for U.S. Appl. No. 11/444,020, mailed Jun. 10, 2009, 6 pages.

(Continued)

*Primary Examiner* — Jae Yu

(74) *Attorney, Agent, or Firm* — Sprinkle IP Law Group

(57) ABSTRACT

Systems and methods for management of a cache are disclosed. In general, embodiments described herein store access counts in file system metadata associated with files in the cache. By encoding access counts in the file system metadata, file I/O operations are reduced. Preferably, the reference count is encoded in an access count timestamp in the file system metadata. The access counts can be decoded based on the difference between the access count time stamp and a base time value, with larger differences reflecting a larger access count. The cache can be aged by advancing the base time value, thereby causing the access count for a file to drop. The base time value can also be stored in file system metadata, thereby reducing file I/O operations when performing aging.

17 Claims, 13 Drawing Sheets

(56) References Cited

U.S. PATENT DOCUMENTS

| | | |
|---|---|---|
| 2003/0135464 A1 | 7/2003 | Mourad et al. |
| 2005/0086392 A1* | 4/2005 | Corley .............................. 710/1 |
| 2005/0172076 A1 | 8/2005 | Olson et al. |
| 2005/0198120 A1 | 9/2005 | Reshef et al. |
| 2005/0204281 A1 | 9/2005 | Choate |
| 2006/0026067 A1 | 2/2006 | Nicholas et al. |
| 2006/0031404 A1 | 2/2006 | Kassab |
| 2006/0112079 A1 | 5/2006 | Holt et al. |
| 2006/0129632 A1 | 6/2006 | Blume et al. |
| 2006/0161881 A1 | 7/2006 | Saad et al. |
| 2007/0226621 A1 | 9/2007 | Dayan et al. |
| 2009/0300408 A1 | 12/2009 | Ash et al. |
| 2012/0137081 A1 | 5/2012 | Shea |

OTHER PUBLICATIONS

Office Action issued in U.S. Appl. No. 11/444,020, mailed Nov. 13, 2009, 7 pages.

European Search Report issued for European Patent Application No. 11 172 237.7, mailed Apr. 3, 2012, 7 pages.

Notice of Allowance issued for U.S. Appl. No. 12/956,921, mailed Nov. 13, 2012, 11 pages.

* cited by examiner

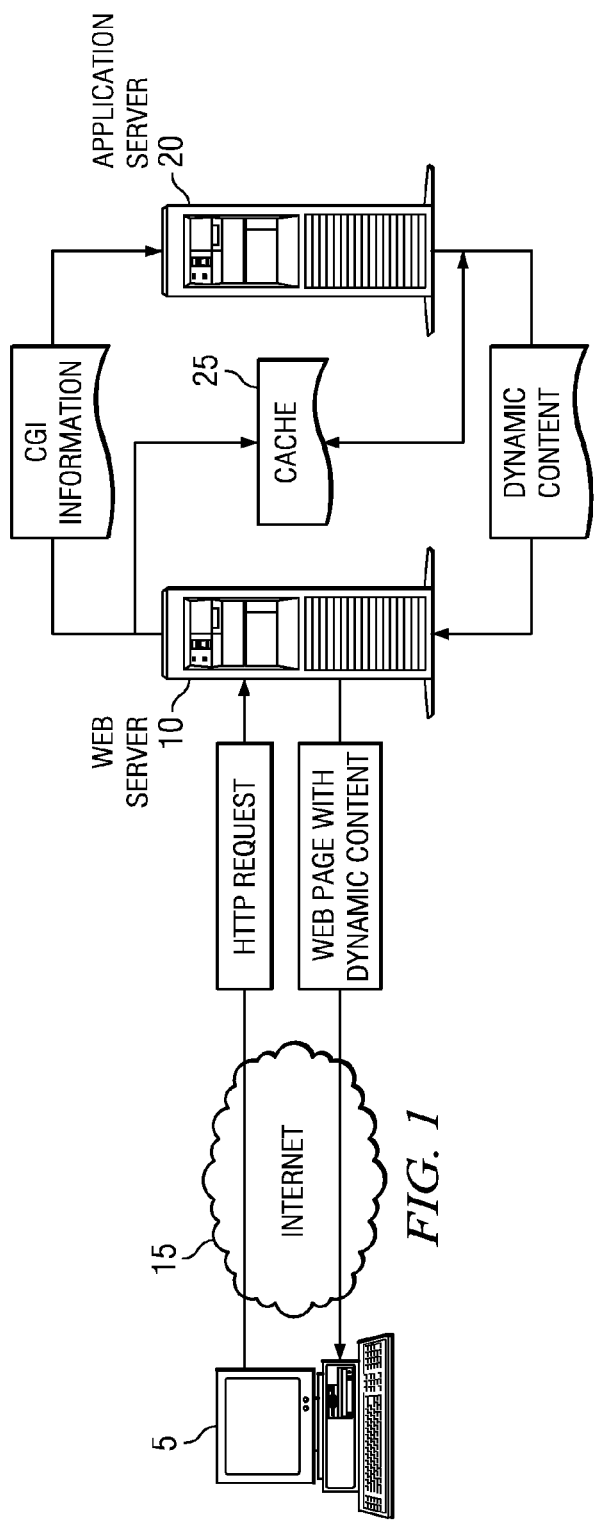
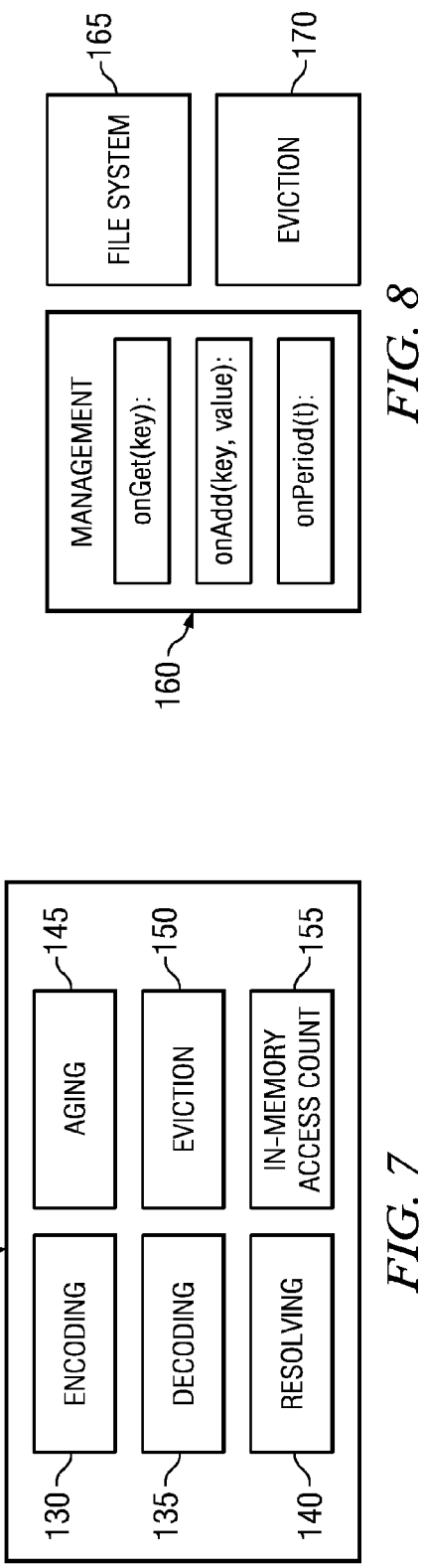

SYSTEM AND METHOD FOR MANAGING A CACHE USING FILE SYSTEM METADATA

CROSS-REFERENCE TO RELATED APPLICATION

This application is a continuation of, and claims a benefit of priority under 35 U.S.C. 120 of the filing date of U.S. patent application Ser. No. 12/956,921 by inventor, James Conrad Shea, entitled "SYSTEM AND METHOD FOR MANAGING A CACHE USING FILE SYSTEM METADATA," filed on Nov. 30, 2010, the entire contents of which are hereby expressly incorporated by reference for all purposes.

TECHNICAL FIELD

This application relates in general to methods and systems for managing a cache and, more particularly, to methods and systems for efficiently tracking accesses to cached content and aging the cache.

BACKGROUND

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety of methods by which to communicate data, one of the most ubiquitous of which is the World Wide Web. Other methods for communicating data over the Internet include e-mail, usenet newsgroups, telnet and FTP.

The World Wide Web is a system of Internet servers, typically called "web servers", that support the documents and applications present on the World Wide Web. Documents, known as web pages, may be transferred across the Internet according to the Hypertext Transfer Protocol ("HTTP") while applications may be run by a Java virtual machine present in an internet browser. Web pages are often organized into web sites that represent a site or location on the world wide web. Web pages and applications can provide a variety of content, including text, graphics, interactive gaming and audio and video content and can link to one or more web pages, files, or applications at the same web site or at other web sites. A user can access web pages using a browser program and can "click on" links in the web pages being viewed to access other web pages.

Because web pages and associated applications can display content and receive information from users, web sites have become popular for enabling commercial transactions. As web sites become more important to commerce, businesses are increasingly interested in quickly providing responses to user's requests. One way of accelerating responses to requests on a web site is to cache the web pages or applications delivered to the requesting user in order to allow faster access time to this content when it is next requested.

Over time, some information in the cache becomes stale. To keep the cache current, information in the cache is periodically removed. Several schemes have been developed to determine which items should be expunged from the cache. Least recently used (LRU) methods discard the least recently used items first. Least frequently used (LFU) methods count how often an item has been accessed over a time period and discard the least frequently used items first. LFU methods tend to give better results for web site caches.

One problem with implementing an LFU policy for file system-based caches is related to performance. LFU caches maintain a reference count in a file associated with each entry. Creating, reading, and updating this reference count require many file I/O operations which are resource expensive. If the cache is large, LFU policies can lead to decreased performance.

Another problem with LFU caches is "cache pollution" in which items that were accessed many times in a short period of time remain in cache. Say, for example, a particular web page representing a breaking news story is stored in a disk cache. This entry may see a great deal of access over a short period of time and then little or no access thereafter. In this case, its high reference count is not a very good indication of its probability of being accessed in the near future, and it might be better to allow the news story to be evicted.

To deal with cache pollution, a common policy variant known as LFU-Aging is employed. From time to time all reference counts in the system are reduced. The effect is that over time earlier accesses are weighted less heavily in the reference count than more recent accesses. Again, however there are potential performance issues because of the many file I/O operations required to read and update the reference counts.

SUMMARY

Systems and methods for managing a cache are disclosed. In general, embodiments described herein store access counts in file system metadata associated with files in the cache. By encoding access counts in the file system metadata, file I/O operations are reduced. Preferably, the reference count is encoded in an access count timestamp in the file system metadata. The access counts can be decoded based on the difference between the access count time stamp and a base time value, with larger differences reflecting a larger access count. The cache can be aged by advancing the base time value, thereby causing the access count for a file to drop. The base time value can also be stored in file system metadata, thereby reducing file I/O operations when performing aging.

One embodiment of a cache management system can include a processor, a memory, a secondary storage device formatted according to a file system and a non-transitory computer readable storage medium storing a set of computer instructions. The computer instructions can be executable to manage a multi-level cache comprising in-memory cache stored in the memory and file system based cache stored on the secondary storage device. The computer instructions can further comprise instructions executable to store a file in the file system based cache on the secondary storage device as a cached file, store an in-memory version of the cached file in the memory, maintain an in-memory access count for the in-memory version of the cached file, encode a file system based cache access count for the cached file in an access count timestamp in file system metadata associated with the cached file and determine whether to evict the cached file from the file system based cache based on the access count timestamp.

One embodiment of a method for managing a cache can comprise storing a cached file in a file-system based cache on the secondary storage device, storing an in-memory version of the cached file in a memory, maintaining in memory an in-memory access count for the in-memory version of the cached file, encoding a file system based cache access count for the cached file in file system metadata associated with the cached file, and transforming the state of the file system based cache by evicting the cached file from the file system based cache based on the access count timestamp value. One embodiment of encoding the file system based cache access count comprises adding the file system based cache access count times a time constant to a base time value to generate an access count timestamp value and storing the access count timestamp in the file system metadata associated with the cached file.

Another embodiment described herein can include a computer program product comprising a non-transitory computer readable medium storing computer executable instructions, the computer executable instructions comprising instruction executable to: store a cached file in a file system based cache stored on a secondary storage device formatted according to a file system, store an in-memory version of the cached file in a memory, maintain an in-memory access count for the in-memory version of the cached file, encode a file system based cache access count for the cached file in file system metadata associated with the cached file, and transform the state of the file system based cache by evicting the cached file from the file system based cache based on the access count timestamp value. One embodiment of encoding the file system based cache access count comprises adding the file system based cache access count times a time constant to a base time value to generate an access count timestamp value and storing the access count timestamp in the file system metadata associated with the cached file.

Embodiments described herein can be implemented in a computer communicatively coupled to a network (e.g., the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (e.g., mouse, trackball, stylist, etc.), or the like.

ROM, RAM, and HD are computer memories for storing computer-executable instructions executable by the CPU. Within this disclosure, the term "computer readable medium" is not limited to ROM, RAM, and HD and can include any type of non-transitory data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (e.g., a HD). Alternatively, the computer-executable instructions may be stored as software code components on a DASD array, magnetic tape, floppy diskette, optical storage device, or other appropriate computer-readable medium or storage device.

In one exemplary embodiment, the computer-executable instructions may be lines of complied C++, Java, or any other programming or scripting code. Other software/hardware/network architectures may be used. For example, various embodiments may be implemented on one computer or shared among two or more computers. In one embodiment, the various functions may be distributed in the network. Communications between computers implementing embodiments of this disclosure can be accomplished using any electronic, optical, radio frequency signals, or other suitable methods and tools of communication in compliance with known network protocols.

These, and other, aspects according to this disclosure will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the systems and methods will become more readily apparent by referring to the exemplary, and therefore nonlimiting, embodiments illustrated in the drawings, wherein identical reference numerals designate the same components. The embodiments may be better understood by reference to one or more of these drawings in combination with the description presented herein. It should be noted that the features illustrated in the drawings are not necessarily drawn to scale.

FIG. 1 is a diagrammatic representation of one embodiment of a system of caching content at a web site;

FIG. 7 is a diagrammatic representation of one embodiment of cache manager;

FIG. 8 is a diagrammatic representation of a specific embodiment of implementing a cache manager.

DETAILED DESCRIPTION

Figure 2:
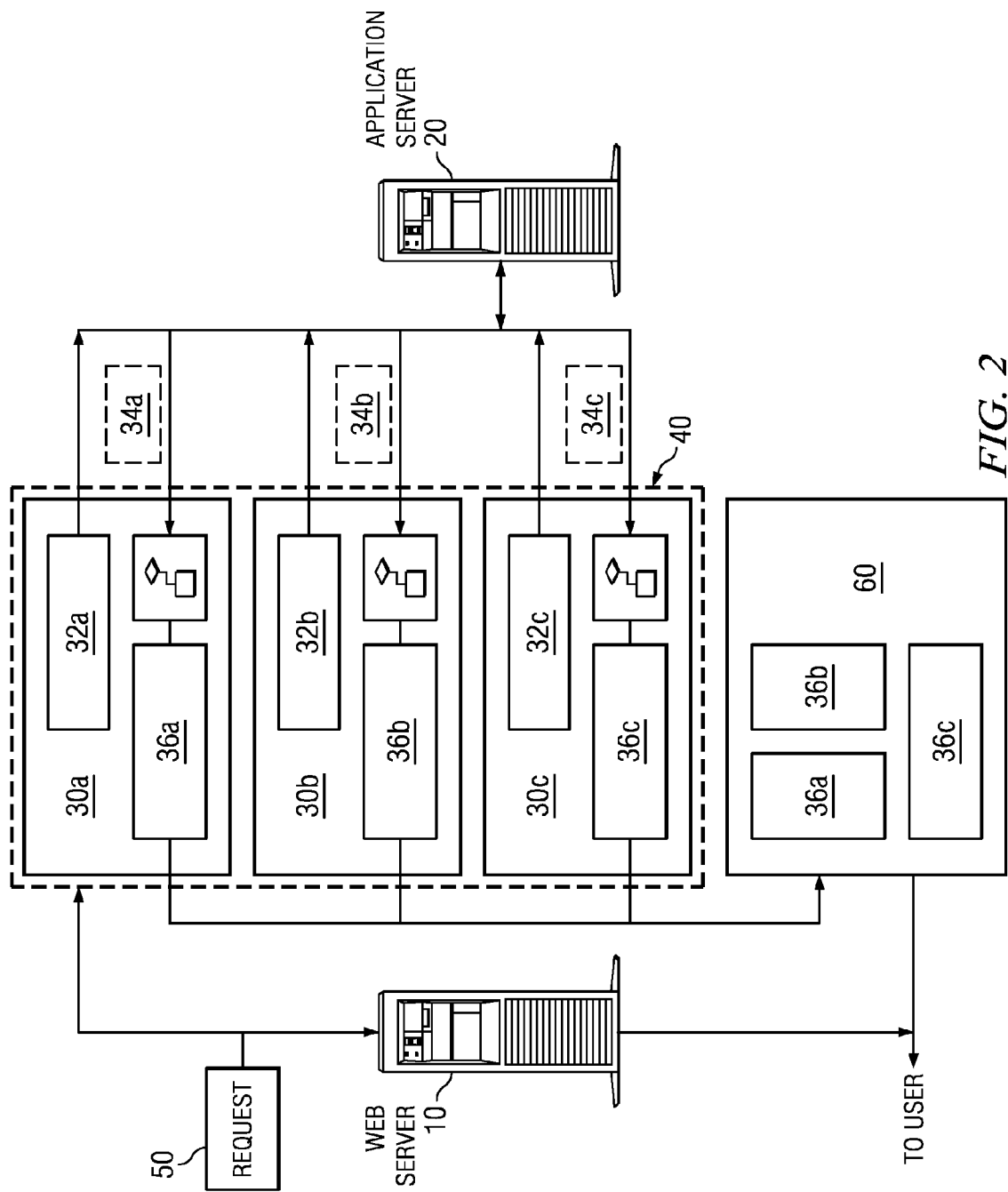
FIG. 2 is a diagrammatic representation of one embodiment of assembling content.

The various features and advantageous details thereof of various embodiments are explained more fully with reference to the accompanying drawings and detailed in the following description. Descriptions of well known starting materials, processing techniques, components and equipment are omitted so as not to unnecessarily obscure the embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Before describing specific embodiments of cache management, an exemplary hardware architecture for use in conjunction with embodiments of cache management is described to provide context. While it may be useful to an understanding of the embodiments of cache management to describe cache management in conjunction with such an exemplary architecture, it will be understood that embodiments of cache management may also be implemented in conjunction with a wide variety of other architectures.

In FIG. 1, a user on client computer 5, through an Internet browser, makes a request (using HTTP for example) for content to a web server 10 over the Internet 15 (or other network). Content may be an application or data provided by a web site such as an HTML page, Java application or the like.

For example, if the requested web page includes dynamic content, the web server 10 may initiate a script, using, for example, the common gateway interface ("CGI") mechanism, to send data (e.g. a request or portions thereof) to an application server 20 to generate the dynamic content. Application server 20 can generate dynamic HTML (or other types of) content according to a programming language such as Java, C or PERL and return the contents to web server 10. Web server 10 can, in turn, communicate the content back to the client computer 5 as the requested web page.

In some cases, content may be assembled from other content chosen based on a request initiated by a user of a site. This may be better explained with reference to FIG. 2 which depicts one example of the assembly of content responsive to a request. Based on an incoming request 50 a content template 40 corresponding to a page or other content may be obtained (e.g. located in memory or storage by web server 10 or application server 20 using at least a portion of the request 50). This template 40 may be associated with one or more components 30, where each of these components 30 is operable to generate content to be included in assembled content according to the template 40 and responsive to request 50. Each of these components 30, in turn, may be associated with one or more rules 32. Each of these rules 32 may be used to obtain or identify content 34 (e.g. from application server 20 or another source such as a data store associated with application server 20) based on a set of sensitivities, for example a format of content (e.g. articles, graphics, etc.), type of content (news, etc.), a category of content (e.g. sports, entertainment, etc.) timing of content (e.g. most recent, within the last day, hour, week, etc.), etc. The content 34 obtained utilizing rules 32 associated with a particular component 30 may then be processed by that component 30 to generate content 36 for that component 30 (for example, formatting the content, extracting portions of the content, generating HTML, WML or XML based on the content, etc.), and the content 36 generated for each of those components 30 assembled to formulate content 60 responsive to the request 50 which may then be sent to the user who initiated the request 50 (it will be understood that content responsive to the request may include other or additional content to that generated by components 30).

Returning to FIG. 1, before or during the assembly of content responsive to a request, web server 10 may check to see if content associated with the request (e.g. content which was generated by a component and used to assemble a response to the request) is stored in cache 25, and if so, web server 10 can communicate this content back to the user on client computer 5 (e.g. use the cached content to assemble a response to the request), otherwise web server may pass on the request or portions thereof to application server 20 as described above such that the appropriate content may be generated. For example, referring briefly again to FIG. 2, template 40 is being used to assemble content responsive to request 50. In this case, web sever 10 may check cache 25 to determine if content 36a, 36b, 36c generated by component 30a, 30b or 30c is present in cache 25. If content 36a, 36b or 36c is present in cache 25 this cached content 36a, 36b or 36c may be used to assemble content 60 in response to the request, while if content corresponding to a component is not present the corresponding component 30a, 30b, 30c may be used to generate the content. By caching content delivered from application server 20, this cached content may subsequently be used to assemble content in response to a request such that the responsive content (e.g. content assembled in response to a request) may be delivered to client computer 5.

Caching content in cache 25 may, however, be somewhat problematic. More particularly, content may be added (e.g. to a data store associated with application server 20), where this content may be pertinent, or otherwise related, to content in cache 25. For example, suppose content responsive to a user request includes content generated by a component operable to generate content comprising headlines corresponding to the five most recent news articles (e.g. in a data store). Suppose further that in response to the user request this content is generated by the component using the five most recent news articles and stored in cache 25.

Now suppose that a news article is added (e.g. to the data store). Here, the content stored in cache 25 has been rendered stale by virtue of the newly added article. In other words, if the component which originally generated the content were now invoked the content generated would be different than the cached content (e.g. it would include the headline from the newly added news article). Thus, any subsequent responses to user requests which utilize the previously cached content (e.g. requests which reference a template associated with the component which generated the cached content) may comprise the stale cached content until such a point as the cached content is flushed or regenerated.

Similarly, cached content within cache 25 may also be rendered stale through changes to content already present when the cached content was generated. Continuing with the above example, suppose content responsive to a user request includes content generated by a component operable to generate content comprising headlines corresponding to the five most recent news articles (e.g. in a data store). Suppose further that in response to the user request this content is generated by the component using the five most recent news articles and stored in cache 25. Now suppose that the headline of one of the five most recent news articles is altered. Here, the content stored in cache 25 has been rendered stale by virtue of the altered article. Again, if the component which originally generated the content were now invoked the content generated would be different than the previously cached content (e.g. it would include the headline corresponding to the altered news article).

As can be seen from the above examples, there may be a period of time where stale content may be served to a user from the cache. As it is desired to communicate current information or content to users, it may be desirable to substantially minimize or otherwise reduce this time period. U.S. Pat. No. 7,818,506, which is hereby fully incorporated by reference herein, provides a system and method of cache management that allows cached content to be regenerated, replaced or updated based on newly added, or changed, content associated with the cached content such that cached content is updated substantially immediately when pertinent new content is added or content from which the cached content was generated is altered.

In addition to updating content in cache 25, it may be desirable to remove content from cache 25 if the content is not used often enough or is unlikely to be used in the near future. Embodiments described herein provide a system and method for cache management that efficiently tracks cache hits, ages the cache and expunges stale entries. Embodiments described herein can provide an advantage over existing cache management systems by significantly reducing the number of file system I/O operations used to track cache hits and age the cache.

Figure 3:
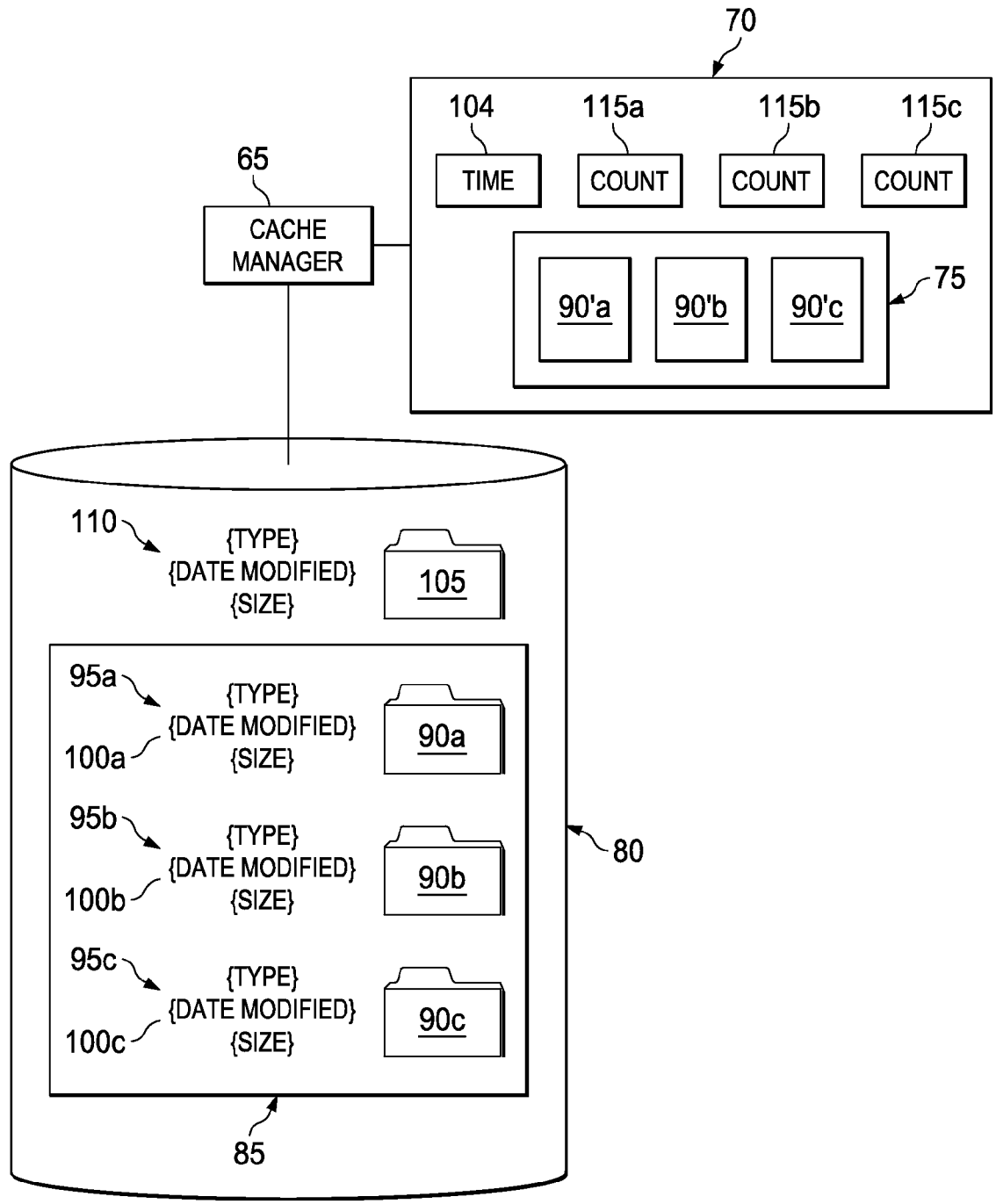
FIG. 3 is a diagrammatic representation of one embodiment of a cache management system.

FIG. 3 is a diagrammatic representation of one embodiment of a cache management system in which cache manager 65 manages a cache (e.g., cache 25 of FIG. 1). Cache manager 65 can be implemented as software instructions stored on one or more computer readable mediums and executed by one or more processors. In general, cache manager 65 can be any application that manages a cache.

Cache 25 may be a multi-level cache that includes storage space on a memory 70 (shown as in-memory cache 75) and storage on a secondary storage device 80 (shown as cache 85). Examples of secondary storages devices include, but are not limited to hard drives, solid state drives, flash memory or other device that acts as secondary storage. Typically, secondary storage device 80 is formatted according to a file system. Accordingly, the cache on secondary storage device 80 is referred to as file system based cache or disk cache (even if it is on a solid state drive).

In general, cached content can be stored as files 90 (individually 90a-c) in file system based cache 85 according to a hierarchical file system. When a file is accessed by cache manager 65 from file system based cache 85, the file can be loaded into in-memory cache 75 as a corresponding in memory version 90'a-c of corresponding cached file 90a-c. Each file stored will have corresponding file system metadata 95 (individually 95a-c) that contains various pieces of information about the file 90 maintained by the file system. Common examples of file system metadata include "created", "type", "last modified" and other metadata.

In addition to the cached files, cache manager 65 can maintain a base time. As described below, the base time is used to determine the access count for a cached file 90 and in aging the cache. The base time value "b" can be maintained in the application memory (represented at 104) used by cache manager 65 and can also be stored in a base time file 105 or the file system metadata 110 of base time file 105. Storing the base time in base time file 105 or metadata 110 allows the base time to persist across application restarts and also allows the cache to be shared by multiple cache managers or other clients. If multiple cache managers (or other applications) share the base time, the cache managers can monitor base time file 105 or metadata 110 for changes. This can be done at intervals in a single-threaded system or asynchronously in a secondary thread in a multi-thread system.

In operation, cache manager 65 can encode a file system based cache access count for each cached file 90 in the associated file system metadata 95. Encoding the access count can transform a timestamp of the file to account for access counts. For example, cache manager 65 may encode the access count for each cache entry in the corresponding "last modified" date field 100 (individually 100a-c) of each file 90.

One reason for using the "last modified" metadata is that applications can typically control that value without interference from the file system itself. For instance, some operating systems maintain a "last access" time as well as "last modified", but the former may not be a good choice because the file system itself would modify that timestamp whenever the file were accessed.

According to one embodiment, cache manager 65 encodes an access count as a time "t" as follows:

$$t=(a*k)+b \qquad [\text{EQN. 1}]$$

where, a is the number of accesses to the entry, $a>=0$, b is a system-wide base time value, and k is a constant that is greater than or equal to the smallest file timestamp granularity supported by the underlying file system. For example, if b represented the time 2010-11-12 13:14:00, and k were 1 sec., then an access count of 15 would be encoded as the time 2010-11-12 13:14:15.

Cache manager 65 can decode the file system based cache access count of a cached asset according to:

$$a=\max(0,(t-b)/k) \qquad [\text{EQN. 2}]$$

In addition to the file system based cache access count "a", cache manager 65 can also maintain an in-memory access count "r" (represented at 115a-c) for a corresponding file 90' that represents the number of times the file has been accessed from memory based cache 75 in a time period. From time-to-time, cache manager 65 can resolve the access counts for a file in file system based cache 85 with the access counts for the file in memory based cache 75. For a given file 90 in file system based cache 85, cache manager 65 can add the access count "r" for the file 90' in memory based cache 75 to the current access count "a" for the file 90 in file system based cache 85 and reset the reference count "r" for the file 90' in memory based cache 70.

Aging the disk based cache is accomplished by increasing the base time value "b" by at least "k" and updating the base time file (or base time file metadata) accordingly. When a cache entry's access count is either read or updated it is done so with respect to the current value of "b", so the net effect of increasing "b" is that the state of the cache is transformed because the access counts of all entries in the cache are reduced by the same amount. In other words, if an original access count "a0" is encoded as:

$$t=(a0*k)+b0 \qquad [\text{EQN. 3}]$$

but then the value of "b" is increased to b1, the new access count "a1" is decoded as $$a1=\max(0,(t-b1)/k) \qquad [\text{EQN. 4}]$$

Mathematically, this is equivalent to:

$$a1=\max(0,a0+(b0-b1)/k) \qquad [\text{EQN. 5}]$$

So given that $b1>b0$ and $(b1-b0)>=k$, then $a1<a0$ unless $a0=0$, in which case $a1=0$.

Cache manager 65 can select files 90 to expunge from cache 25 based on the access count. For example, cache manager 65 can remove the files 90 having the lowest 10% of access counts (or lowest 10% of last modified dates) or cache manager 65 can remove the files having access counts (or last modified dates) below a selected value.

Figure 4:
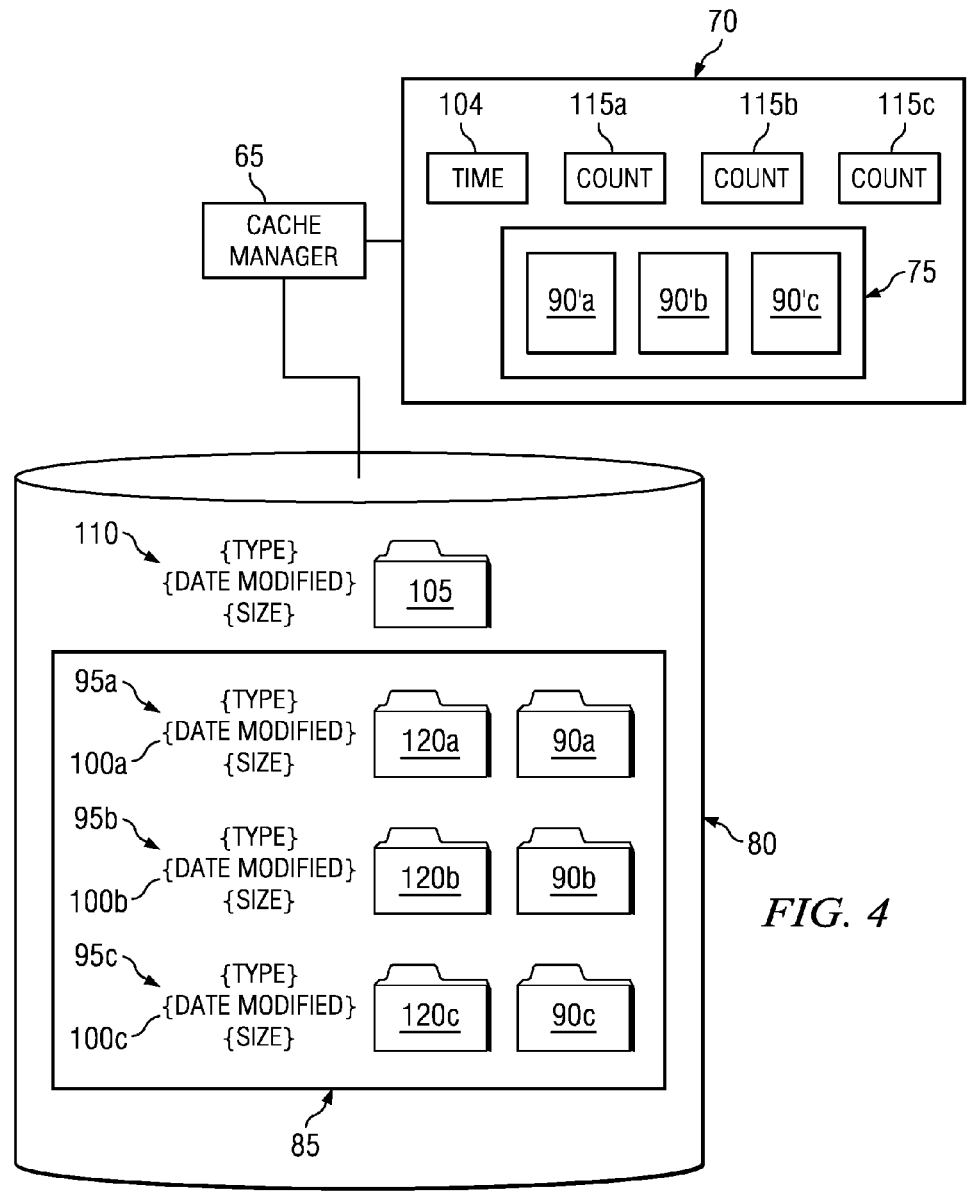
FIG. 4 is a diagrammatic representation of another embodiment of a cache management system.

FIG. 4 is a diagrammatic representation of another embodiment of a cache management system in which cache manager 65 manages cache 25. The embodiment of FIG. 4 is similar to that of FIG. 3 except that for each cached content file 90, cache manager 65 can store a second access count file 120 (individually 120*a-c*). Because it may not be desirable to modify the file system metadata of a cached content file 90 to track access counts, cache manager 65 can track access counts in the file system metadata 95 of an associated and, potentially empty, access count file 120. Thus, the timestamp in field 100 associated with a cached content file can be the metadata for the cached content file or the metadata of another file associated with the cached content file.

FIGS. 5A-5E and FIGS. 6A-6H provide examples of tracking access counts and aging the cache. In the example of FIGS. 5A-5E, it is assumed that i) there is a single level disk cache used by the cache manager's 65, ii) the underlying file system supports timestamps at a 1 sec. granularity, iii) the cache is initially empty, and iv) the initial value selected for the base time is 1:00:00 AM, local time today. "Effective Reference Count" is the reference count which is represented by that timestamp.

Figure 5A:
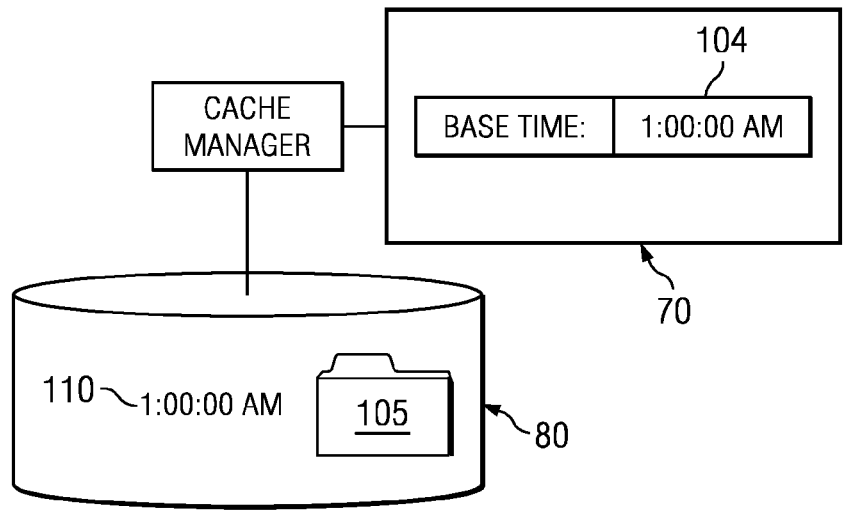
FIGS. 5A-E are diagrammatic representations of one example of managing a cache.

In FIG. 5A, file system based cache 85 stores a base time file 105 having a timestamp of 1:00:00 AM in metadata 110. Because the base time "b" is stored in metadata 110, base time file 105 can be empty. The base time can be loaded in the cache manager's 65 memory (indicated at 104).

Figure 5B:
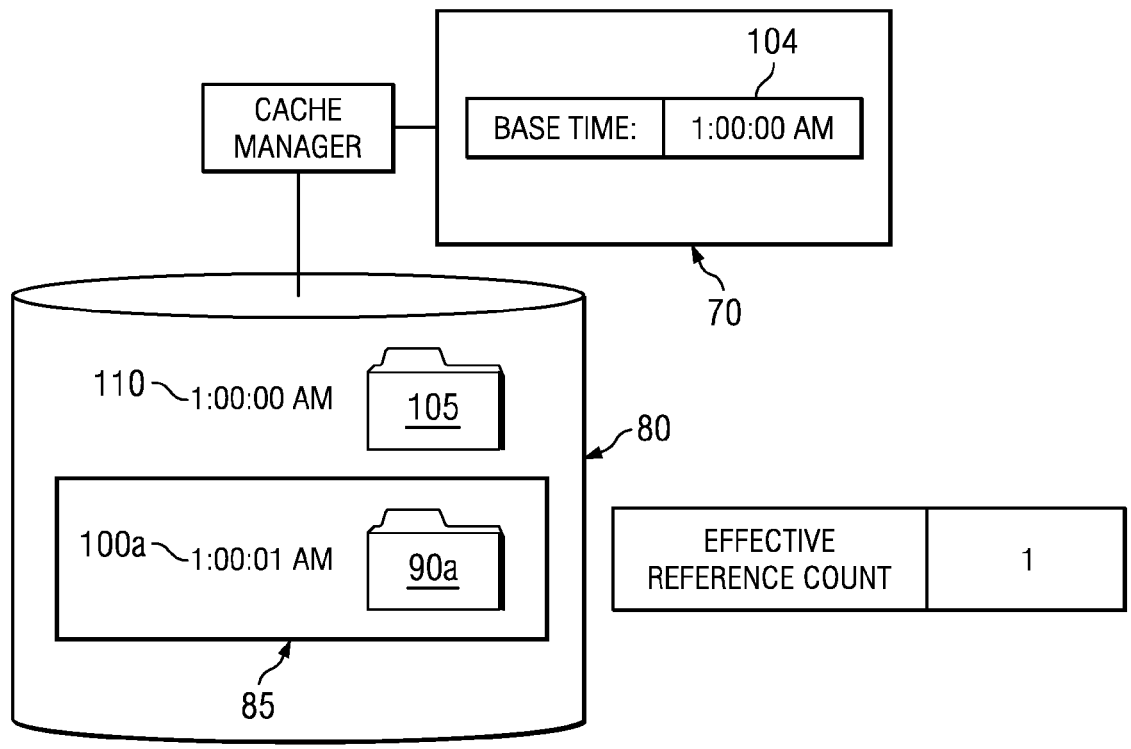

In FIG. 5B, a single file 90*a* has been added to file system based cache 85. Because this represents the first access of file 90*a*, the timestamp 100*a* is 1:00:01 AM, representing an access count of 1. Again, timestamp 100*a* can be the timestamp for file 90*a* or the time timestamp of an associated file 120*a* (see FIG. 4).

Figure 5C:
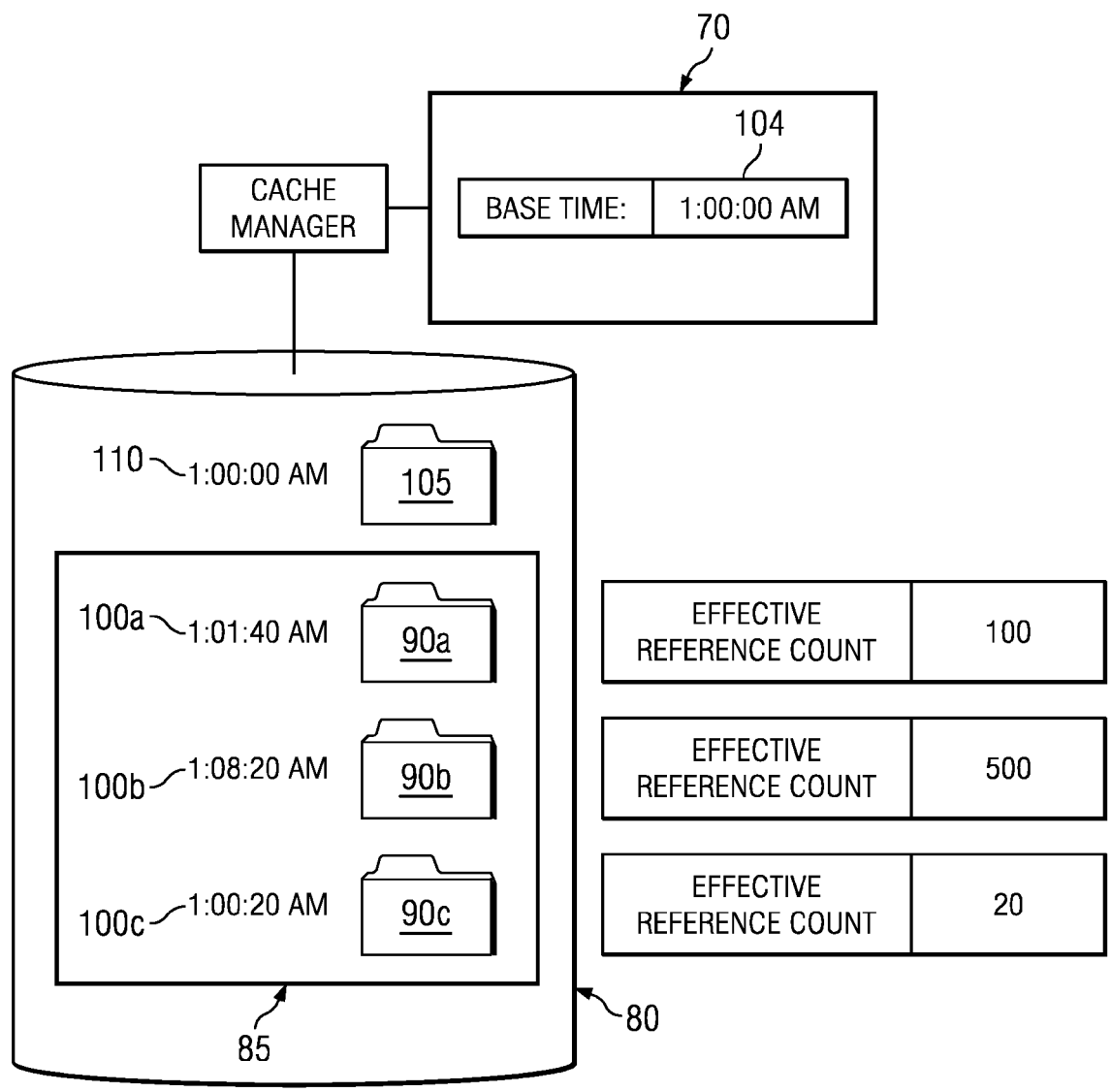

In FIG. 5C, more files have been added to file system based cache 85 and the files have been accessed a number of time. Each of the timestamps 100*a-c* indicates how many times each file 90*a-c* has been accessed.

Figure 5D:
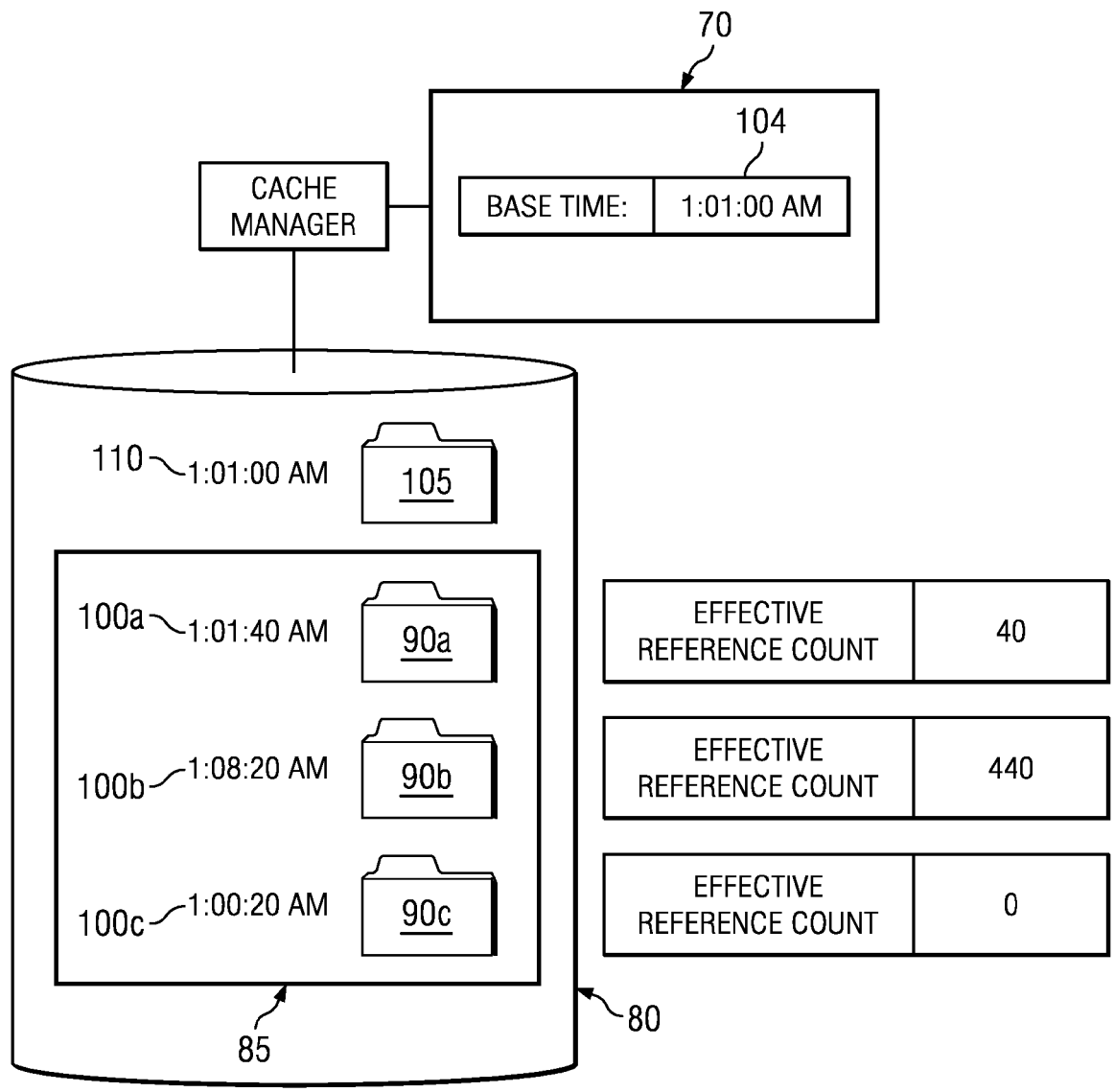

In FIG. 5D, cache manager 65 has determined that it is time to age the cache by one minute. Cache manager 65 updates the base timestamp in metadata 110 and in memory (indicated at 104). As can be seen in the example of FIG. 5D, this effectively reduces the access count for each of the files.

Figure 5E:
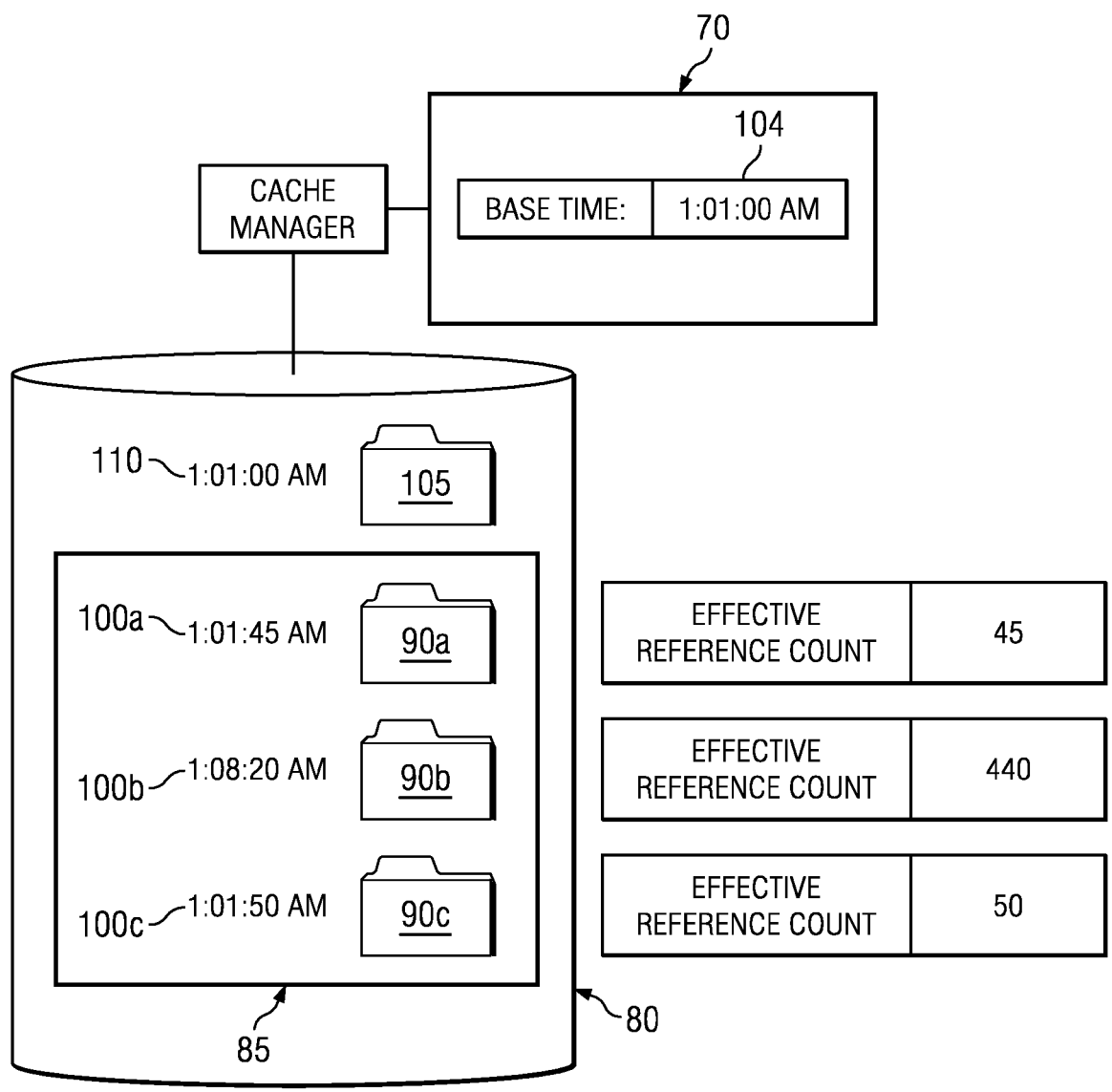

The next time cache manager 65 adds access counts for a file, it can do so relative to the new base time. In FIG. 5E, for example, file 90*a* has been accessed 5 more times and file 90*c* has been accessed 50 more times compared to FIG. 5D.

Since the time cache manager 65 started, file 90*a* has been accessed 105 times whereas file 90*c* has been accessed only 70 times. Nevertheless, since most accesses to file 90*c* have happened more recently, file 90*c* ends up with the higher effective reference count. Thus, should it be decided to expunge an entry from the cache, file 90*a* may be evicted in preference to file 90*c* on the theory that the more recent accesses of file 90*c* are a better predictor of it being requested again in the near future.

FIGS. 6A-6H provide another example of managing a cache. In the example of FIGS. 6A-6G, it is assumed that i) there is a single level disk cache used by the application performing cache management, ii) the underlying file system supports timestamps at a 1 sec. granularity, iii) the cache is initially empty, and iv) the initial value selected for the base time is 1:00:00 AM, local time today. "Timestamp" denotes the actual timestamp of a file in the disk cache. "Effective Reference Count" is the reference count which is represented by that timestamp. "Residual Reference Count" represents the access count for the file in memory.

Figure 6A:
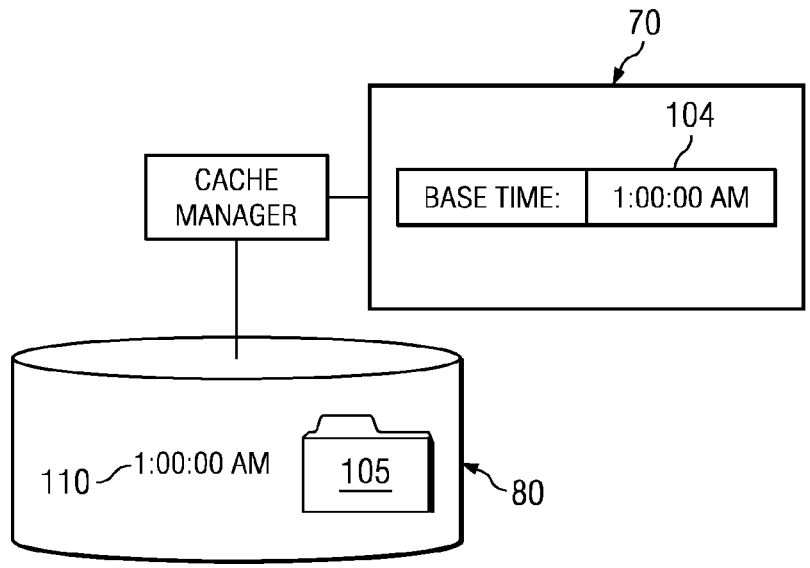
FIGS. 6A-H are diagrammatic representations of another example of managing a cache.

In FIG. 6A, file system based cache 85 stores a base time file 105 having a timestamp of 10:00:00 AM in metadata 110. Because the base time b is stored in metadata 110, base time file 105 can be empty. The base time can be loaded in the cache manager's 65 memory (indicated at 104).

Figure 6B:
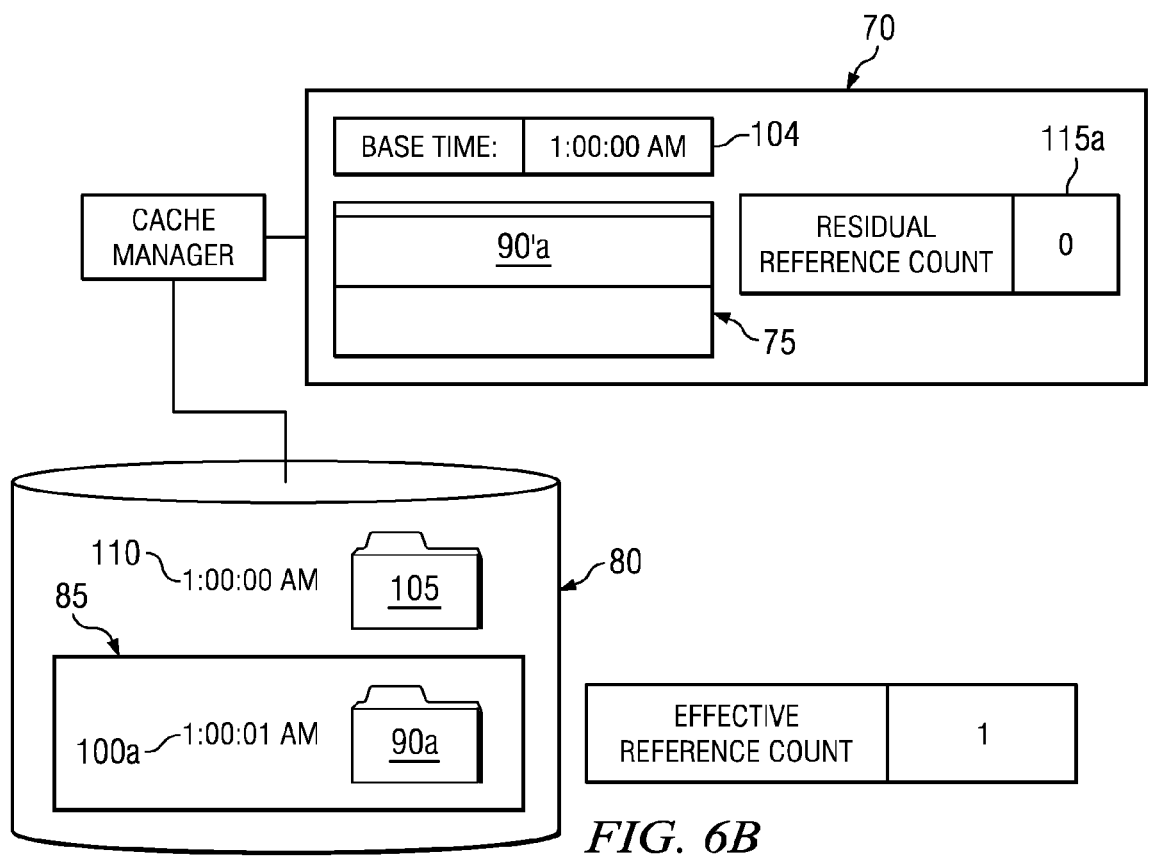

In FIG. 6B, a single file 90*a* has been added to file system based cache 85. Because this represents the first access of file 90*a*, the timestamp 100*a* is 1:00:01, representing an access count of 1. Additionally, file 90*a* is loaded into memory based cache 80 as file 90'*a* having an access count 115*a* of 0.

Figure 6C:
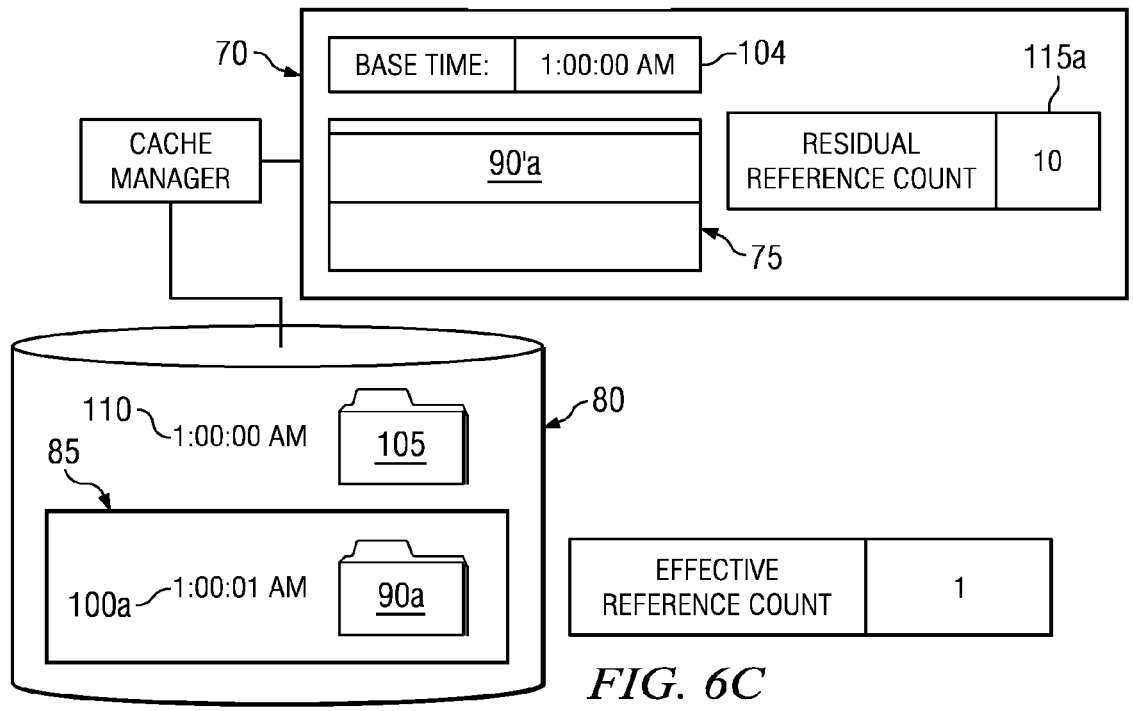

FIG. 6C illustrates that over time, file 90'*a* is accessed 10 more times from memory based cache 75. Consequently, access count 115*a* of file 90'*a* is 10. However, since file 90*a* has not been accessed from file system based cache 85, the timestamp 100*a* remains 1:00:01.

Figure 6D:
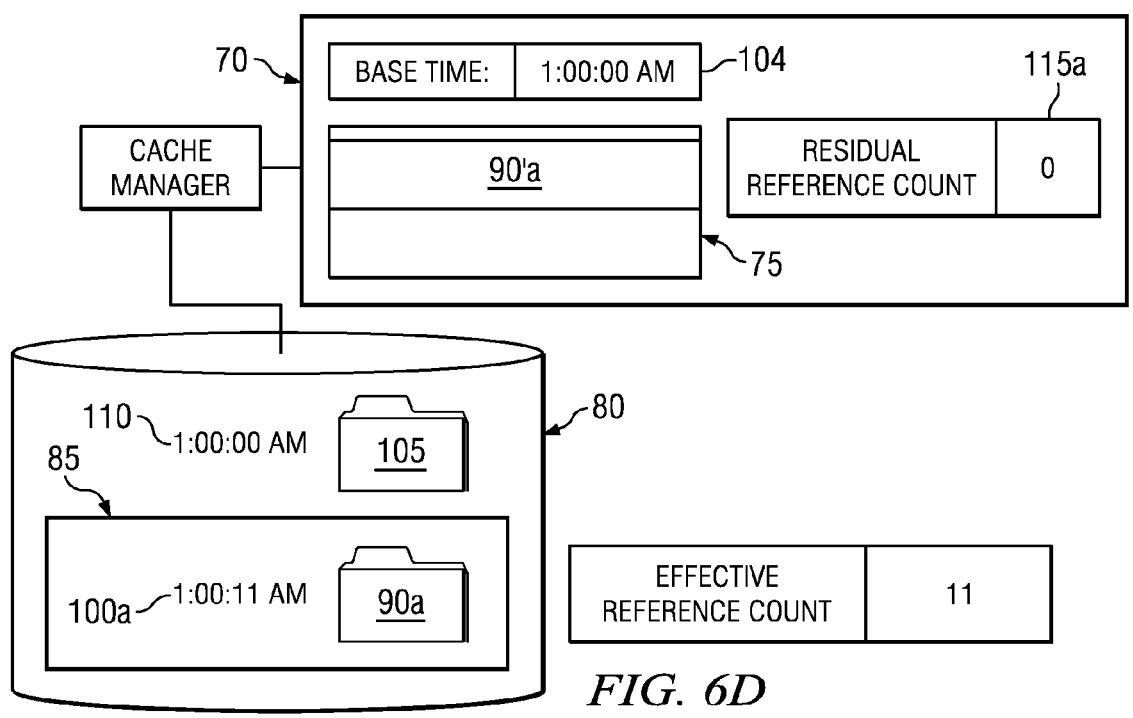

In FIG. 6D, cache manager 65 has determined that it is time to resolve the access count of file 90*a* with the number of times the file has been accessed from memory. The application decodes the current access count by decoding the current time stamp, i.e.:

$$\text{Effective Reference Count} = \max(0, (\text{Timestamp} - \text{Base Time})/1 \text{ sec.}) = 1 \quad \text{[EQN. 6]}$$

The application then calculates the new reference count:

$$\text{New Reference Count} = \text{Effective Reference Count} + \text{Residual Reference Count} = 11 \quad \text{[EQN. 7]}$$

The application then re-encodes time stamp 100*a* and resets access count 115*a*.

$$\text{New Timestamp} = \text{Base Time} + (11 \text{ sec}) \quad \text{[EQN. 8]}$$

Figure 6E:
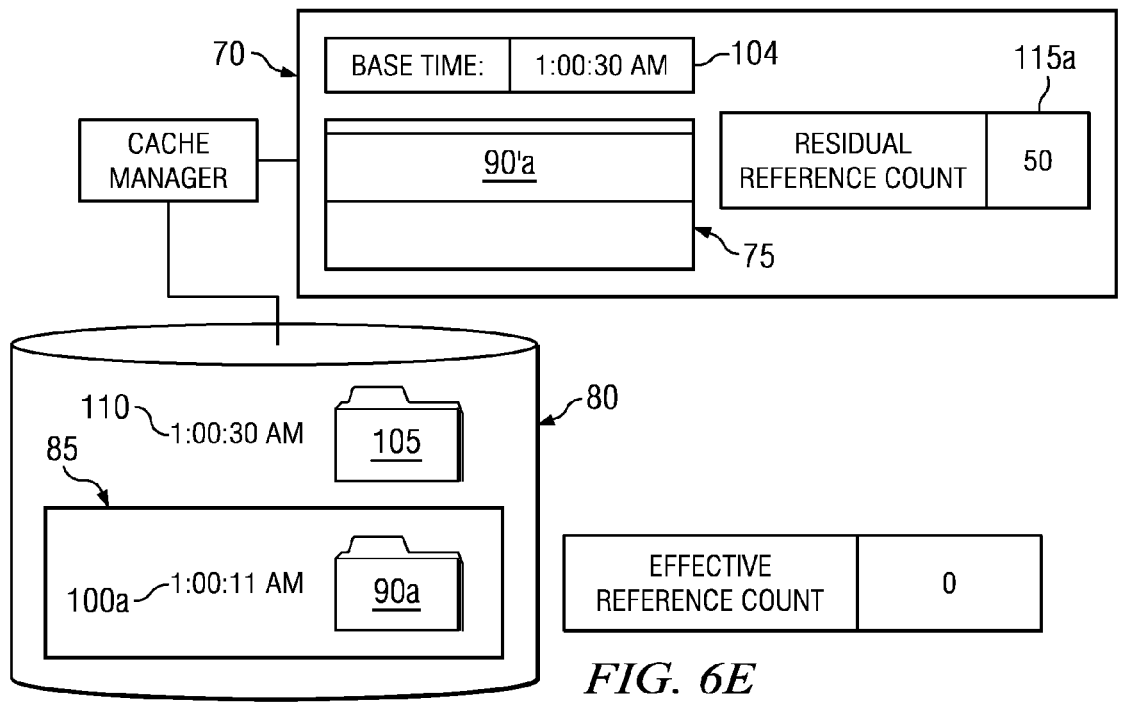

Now assume file 90'*a* is accessed 50 more times, but in the mean time the base time is adjusted to 1:00:30 as shown in FIG. 6E. When cache manager 65 resolves the access counts for file system based cache 85 with the access counts for in memory cache 75, cache manager 65 will determine the effective reference count according to:

$$a = \max(0, (t - b1)/k) \quad \text{[EQN. 9]}$$

Figure 6F:
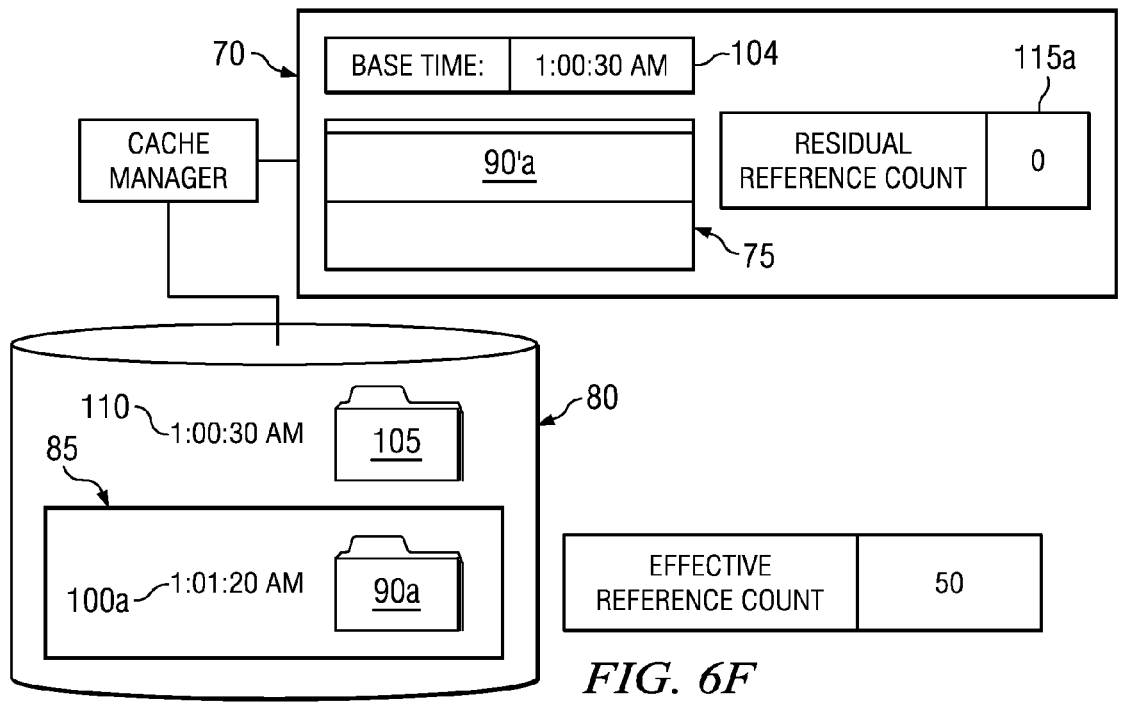

This yields a reference count of 0. Cache manager 65 can then add the reference count to access count 115*a*, re-encode the access count in time stamp 100*a* and reset access count 115*a* as shown in FIG. 6F.

Figure 6G:
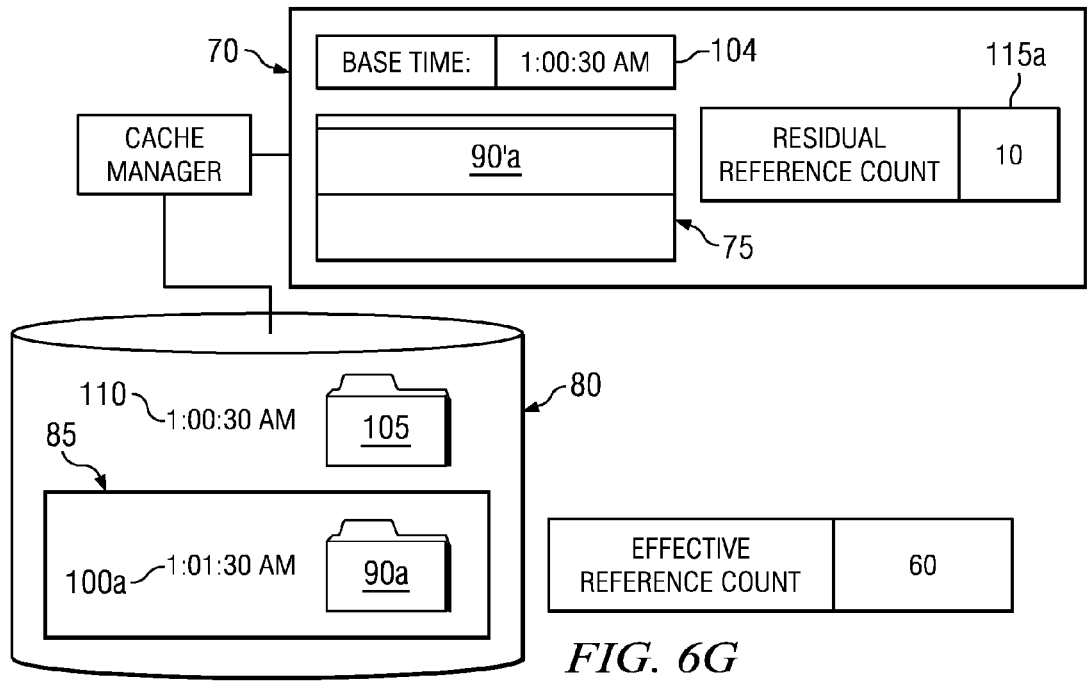
Figure 6H:
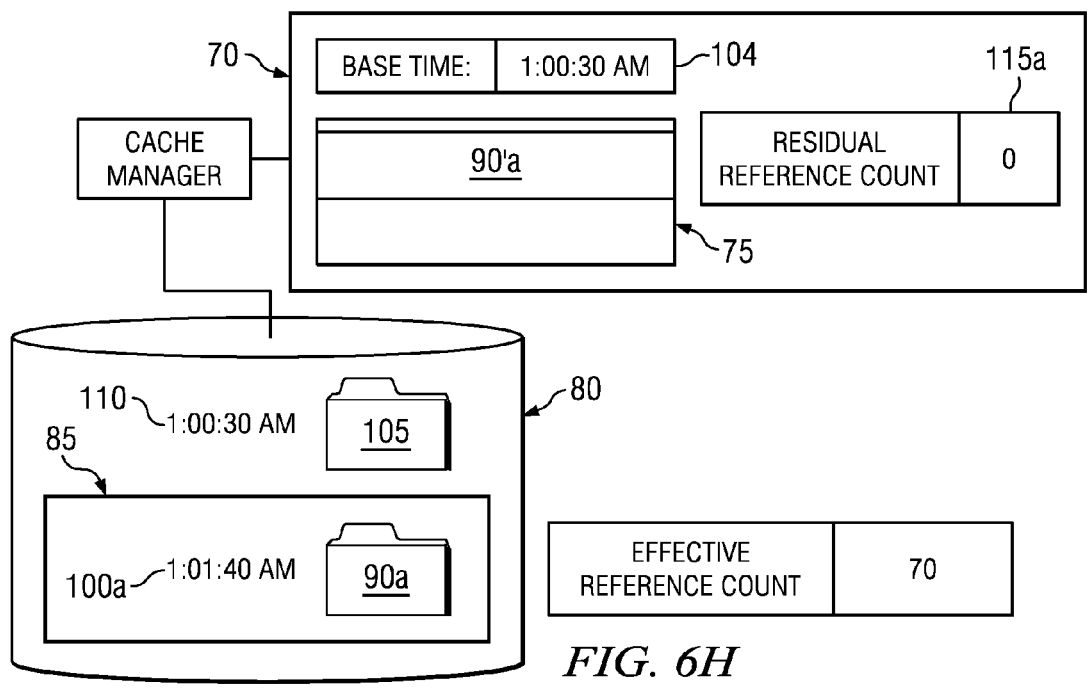

Finally, assume on-disk cache 85 is shared with a second process that has its own in-memory cache 75. Further assume file 90*a* is accessed in each in-memory cache 70 another 10 times, but the second process resolves the access count for file system based cache 85 first. Timestamp 100*a* will be updated as shown in FIG. 6G. Although the time stamp 100*a* has been updated, the value 115*a* is not reset (though it may be reset in the second processes' memory). When the current cache manager 65 resolves the access counts, the current application can update timestamp 100*a* and reset access count 115*a* in its memory as shown in FIG. 6H.

In the foregoing examples, cache manager 65 aged the cache to effectively reduce the file system based cache access counts. Cache manager 65 can age file system based cache 85 according to a schedule, a predetermined frequency, at the occurrence of a specified event or according to another scheme. Cache manager 65 can change base time "b" by a set value each time file system based cache 85 is aged. For example, a simple implementation could increase b by 1 min. every hour. According to another embodiment, cache manager 65 can change the base time based on an analysis of timestamp values for cached content. A more sophisticated approach, for example, could take into account the actual distribution of access time values in the cache to determine when to age the cache and by how much.

According to one embodiment, cache manager 65 periodically takes a random sample of timestamps associated with a specified number of cached content files. By way of example, but not limitation, every 15 seconds cache manager 65 can review the timestamps associated with 400 files. The base time is adjusted to be greater than the value the bottom 10% of access count time stamps.

Either at the same time aging occurs or at a different time, cache manager 65 can flush files from file system based cache 85 according to specified rules. According to one embodiment, cache manager 65 can flush files having timestamps below a certain value, can flush a particular percentage of files or otherwise flush files based on their associated timestamps or access counts.

FIG. 7 is a diagrammatic representation of one embodiment of cache manager 65. Cache manager 65 can comprise an encoding module 130, a decoding module 135, a count resolving module 140, an ageing module 145, an eviction module 150 and an in-memory access count module 155. Each module is a set of computer executable instructions stored on one or more computer readable media. The various modules can be portions of monolithic code, functions, objects of a program or be other code implemented according to any suitable software architecture. Thus, while described as separate, the modules may be implemented as a single piece of code or multiple pieces of code.

Encoding module 130 can encode access counts in a timestamp and store the timestamp in metadata associated with a cached content file in a file system. Decoding module 135 can retrieve the timestamp from the file system and decode the file-system based cache access count. In-memory access count module 155 can maintain a count of accesses of a cached item in memory. Resolving module 140 can receive the in-memory access count from access count module 155 and file system based cache access count from decoding module 135, determine the new file system based cache access count and pass the new file system based access count to the encoding module. Aging module 145 can determine when and by how much to age the cache and can adjust the base time to age the cache. Eviction module 150 can expunge items from cache based on one or more rules.

FIG. 8 is a diagrammatic representation of a specific embodiment of implementing a cache manager. Embodiments herein can be implemented as one or more Java classes for use with a multithreaded cache manager 65. According to one embodiment, a management class 160 acts as the encoding module 130, decoding module 135, count resolving module 140, and ageing module 145 of FIG. 7. File system class 165 can be implemented as a Java class that interfaces with the file system. An eviction class 170 can be implemented as a class that performs cache evictions based on the timestamp values of the access count files 120 (see FIG. 4). These classes can be used within a more generalized caching framework which implements both first level cache in memory and a second level cache on disk.

When cache manager 65 accesses a cached entry from file system based cache, cache manager 65 can call one or more of the following methods on the management class 160:

onGet(key): Called when an attempt is made to read an entry from memory based cache, this method increments the in-memory access count for the entry associated with key. It may also revalidate. Revalidation includes checking to see if any in-memory copy of the cache entry needs to be re-read from disk because of being updated by another process. On revalidation the access count on disk is resolved at this time. The current access count on disk is decoded, incremented by the in-memory access count, and then re-encoded using the current base time. This is set as the last modified timestamp for the appropriate access count file 120 (see FIG. 4). Finally, the in-memory access count is set to 0 since the existing accesses have been recorded. According to one embodiment, updates to the on-disk reference count occur only on revalidations, thereby reducing accesses to the file system.

onAdd(key, value): Called when a new entry is added to the cache. The method initializes the in-memory access count to 1.

From time to time (roughly every 15 sec. or more often or less often) cache manager 65 will wake up a periodical thread which will call a on Period(t) method, passing in the current time. At this time a random sample of up to 400 (or a larger or smaller sample size) access count file timestamps is taken. These files are sorted by timestamp and the entry at the $10^{th}$ percentile (or other percentile) is found. The new base time is set to the timestamp of this entry or the current base time is increased by some specified amount. In cases where multiple cache managers 65 access files and the base time, it may be desirable to set exclusive access to timestamps. A background thread, or other process, can manage updating of timestamps and the base time by multiple cache managers.

From time to time, methods in eviction class 170 are called to review the access count timestamps and evict entries having timestamps below a threshold value. The threshold value may be the base time value, a value that at a particular percentile of access count time stamps (e.g., $10^{th}$ percentile) or other threshold value.

Figure 9:
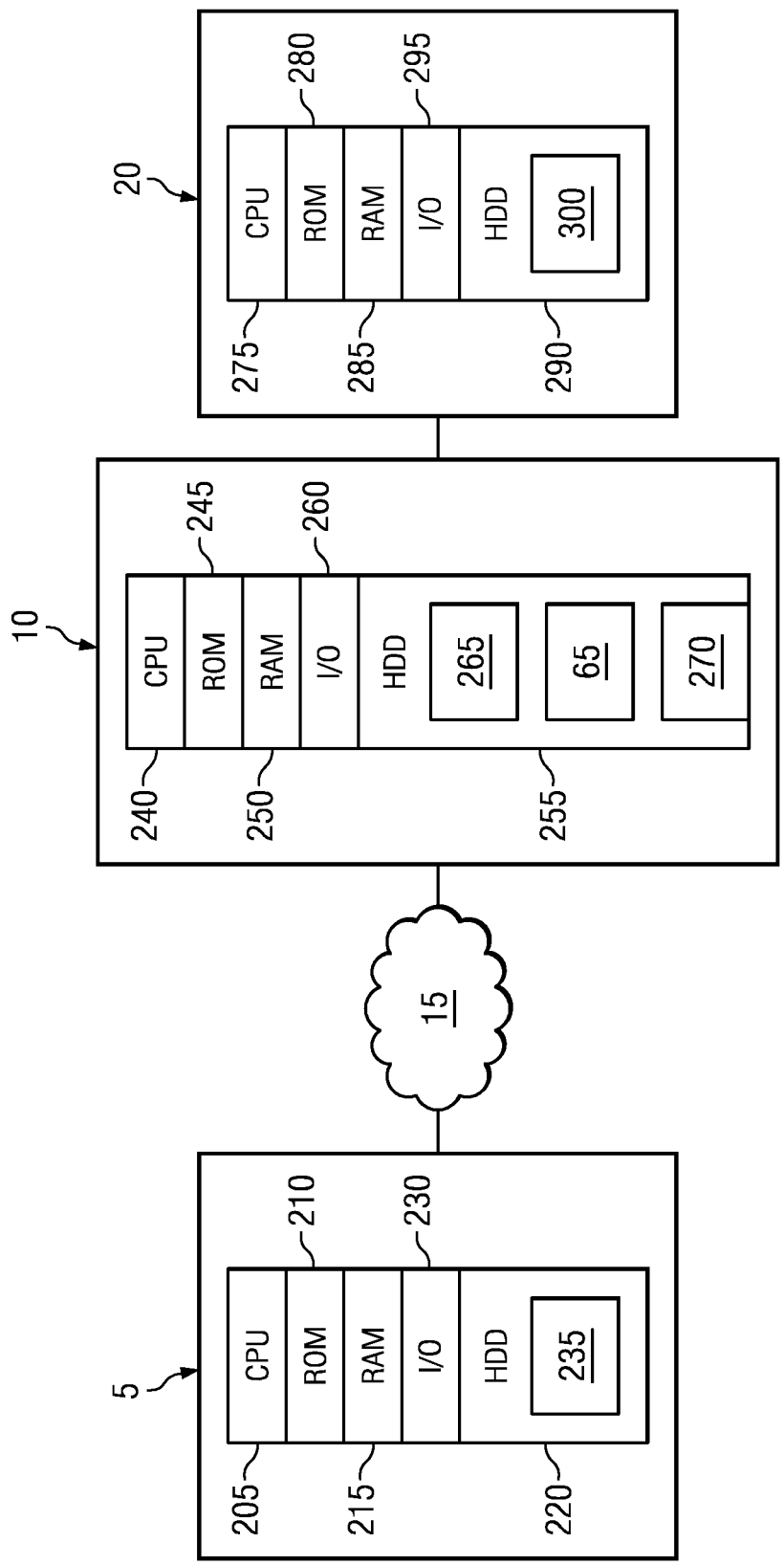
FIG. 9 is a diagrammatic representation of one embodiment of a computer system.

FIG. 9 illustrates the exemplary architecture in more detail and includes a client computer 5 and web server 10 can be bi-directionally coupled to network 15. The web server 10 can be bi-directionally coupled to the application server 20. Many other alternative configurations are possible and known to skilled artisans.

The client computer 5 includes a central processing unit ("CPU") 205, a read-only memory ("ROM") 210, a random access memory ("RAM") 215, a hard drive ("HD") or storage memory 220, and input/output device(s) ("I/O") 230. The I/O devices 230 can include a keyboard, monitor, printer, electronic pointing device (e.g., mouse, trackball, etc.), network I/O devices or the like. The client computer 5 can include a desktop computer, a laptop computer, a personal digital assistant, a cellular phone, or nearly other device capable of communicating over the Internet or an intranet. Client computer 5 can store a browser 235 used to communicate with web server 10.

The web server 10 can include a CPU 240, ROM 245, RAM 250, HD 255, I/O 260. Server 10 can store a web server program 265, cache manager 65 and a file system program 270 (e.g., as part of an operating system). Cache manager 65 can be any application that manages a cache, whether as a standalone program or as part of a larger program. The cache can be maintained on one or more of RAM 250 and HD 255.

The application server 20 can include a CPU 275, ROM 280, RAM 285, HD 290, and I/O 295. In one non-limiting embodiment, the application server can include a page generator 300 used to fulfill requests of coming from the web server 10. Each of the computers in FIG. 9 may have more than one CPU, ROM, RAM, HD, I/O, or other hardware components. For simplicity, each computer is illustrated as having one of each of the hardware components, even if more than one is actually used. It should be understood that the embodiment of FIG. 9 is provided by way of example and not limitation and functions described herein can be otherwise distributed. Moreover, cache management can performed in other contexts and is not limited to managing web content.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

For example, while the foregoing specification primarily uses the example of encoding counts in the "last modified" metadata, other pieces of metadata can be used. The set of file metadata attributes is usually dictated by the file systems and the APIs that are used to access the metadata. In alternative embodiments, any piece of metadata can be used to encode the counts as a timestamp or according to other formats from which the reference count can be decoded and updated. If an application is permitted to extend the file system metadata, then the reference counts can simply be kept as part of the file system metadata in a dedicated attribute.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A cache management system comprising:
a processor;
a memory;
a secondary storage device;
a non-transitory computer readable storage medium storing a set of computer instructions, the set of computer instructions comprising instructions executable to:
manage a multi-level cache comprising a first cache and a second cache;
store an asset in the second cache as a cached asset;
store a version of the cached asset in the first cache;
maintain a first cache access count for the version of the asset in the first cache;
encode a second cache access count for the cached asset in an access count timestamp in metadata associated with the cached asset;
determine whether to evict the cached asset from the second cache based on the access count timestamp;
update the second cache access count with the first cache access count to generate an updated second cache access count; and
encode the updated second cache access count in an updated access count timestamp.

2. The cache management system of claim 1, wherein encoding the second cache access count comprises adding the second cache access count times a time constant to a base time value to generate an access count timestamp value and storing the access count timestamp value in the metadata associated with the cached asset.

3. The cache management system of claim 2, wherein the set of computer instructions further comprise instructions executable to:
decode the second cache access count from the access count timestamp;
add the first cache access count to the second cache access count to generate the updated second cache access count.

4. The cache management system of claim 2, wherein the set of computer instructions further comprise instructions executable to age the second cache by updating the base time value.

5. The cache management system of claim 4, wherein the set of computer instructions further comprise instructions executable to evict the cached asset from the second cache if the access count timestamp is less than a threshold time.

6. A method for managing a multi-level cache for a device having a first cache and a second cache, the method comprising:
storing an asset in the second cache as a cached asset;
storing a version of the cached asset in the first cache;
maintaining a first cache access count for the version of the cached asset in the first cache;
encoding a second cache access count for the cached asset in an access count timestamp in metadata associated with the cached asset;
transforming a state of the second cache by evicting the cached asset from the second cache based on the access count timestamp;
updating the second cache access count with the first cache access count to generate an updated second cache access count; and
encoding the updated second cache access count in an updated access count timestamp.

7. The method of claim 6, wherein encoding the second cache access count comprises adding the second cache access count times a time constant to a base time value to generate an access count timestamp value and storing the access count timestamp value in the metadata associated with the cached asset.

8. The method of claim 7, wherein updating the second cache access count comprises:
decoding the second cache access count from the access count timestamp; and
adding the first cache access count to the second cache access count to generate the updated second cache access count.

9. The method of claim 8, further comprising aging the second cache by updating the base time value to a new base time value.

10. The method of claim 9, further comprising evicting the cached asset from the second cache if the access count timestamp value is less than the new base time value.

11. The method of claim 10, further comprising providing a cache management system comprising a memory, a storage device, an in-memory access count module, an encoding module, a decoding module, a resolving module, an aging module, and an eviction module, wherein:
maintaining the first cache access count is performed by the in-memory access count module;
encoding the second cache access count is performed by the encoding module;
decoding the second cache access count from the access count timestamp is performed by the decoding module;
updating the second cache access count with the first cache access count is performed by the resolving module;
aging the second cache is performed by the aging module; and
expunging the cached asset from second cache is performed by the eviction module.

12. The method of claim 6, further comprising maintaining an access count file associated with the cached asset in a file-system based cache, wherein the metadata associated with the cached asset is file system metadata for the access count file.

13. A computer program product comprising a non-transitory computer readable medium storing computer executable instructions, the computer executable instructions comprising instructions executable to:
- store a version of a cached asset in a first cache, the cached asset stored in a second cache;
- maintain a first cache access count for the version of the cached asset in the first cache;
- encode a second cache access count for the cached asset in an access count timestamp in metadata associated with the cached asset;
- transform a state of the second cache by evicting the cached asset from the second cache based on the access count timestamp;
- update the second cache access count with the first cache access count to generate an updated second cache access count; and
- encode the updated second cache access count in an updated access count timestamp.

14. The computer program product of claim 13, wherein encoding the second cache access count comprises adding the second cache access count times a time constant to a base time value to generate an access count timestamp value and storing the access count timestamp value in the metadata associated with the cached asset.

15. The computer program product of claim 14, wherein the computer instructions further comprise instructions executable to:
- decode the second cache access count from the access count timestamp; and
- add the first cache access count to the second cache access count to generate the updated second cache access count.

16. The computer program product of claim 15, wherein the computer instructions further comprise instructions executable to age the second cache by updating the base time value to a new base time value.

17. The computer program product of claim 16, wherein the computer instructions further comprise instructions executable to expunge the cached asset from the second cache based on the access count timestamp.

* * * * *